United States Patent
Balk et al.

(10) Patent No.: US 7,897,117 B2
(45) Date of Patent: Mar. 1, 2011

(54) CATALYTIC CONVERTER WITH MOUNTING DEVICE FOR A HOT EXHAUST GAS OXYGEN SENSOR

(75) Inventors: Timothy S. Balk, Leslie, MI (US); Pernilla S. Sullivan, Ann Arbor, MI (US); Thomas A. Cothron, Canton, MI (US); Bradley B. Walworth, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 761 days.

(21) Appl. No.: 11/856,931

(22) Filed: Sep. 18, 2007

(65) Prior Publication Data

US 2008/0131335 A1 Jun. 5, 2008

Related U.S. Application Data

(60) Provisional application No. 60/872,588, filed on Dec. 1, 2006.

(51) Int. Cl.
*B01D 53/88* (2006.01)

(52) U.S. Cl. ................. 422/171; 422/179; 422/180; 422/221

(58) Field of Classification Search ............... 422/105, 422/171, 177, 179, 180, 221; 60/299
See application file for complete search history.

(56) References Cited

U.S. PATENT DOCUMENTS

| | | | | |
|---|---|---|---|---|
| 4,278,639 | A | * | 7/1981 | Tadokoro et al. ............ 422/171 |
| 5,094,073 | A | * | 3/1992 | Worner et al. ................. 60/299 |
| 6,001,314 | A | * | 12/1999 | Buck et al. .................. 422/177 |
| 6,632,406 | B1 | * | 10/2003 | Michelin et al. ............ 422/178 |
| 7,276,213 | B2 | * | 10/2007 | Barron et al. ............... 422/179 |
| 7,452,512 | B2 | * | 11/2008 | Quackenbush .............. 422/171 |
| 2004/0105792 | A1 | * | 6/2004 | Worner et al. ............... 422/180 |
| 2006/0024215 | A1 | | 2/2006 | Kroner et al. |
| 2007/0119156 | A1 | * | 5/2007 | Hill et al. ..................... 60/302 |

* cited by examiner

*Primary Examiner*—Jill Warden
*Assistant Examiner*—Joye L Woodard
(74) *Attorney, Agent, or Firm*—Harness, Dickey & Pierce, P.L.C.

(57) ABSTRACT

A catalytic converter having a housing holding upstream and downstream catalytic material carrying substrates or bricks includes a ring located between the substrates, the ring having a gap therein for receipt of a mid-bed oxygen sensor. The ring traps a layer of insulating material between the ring and the converter housing or shell surface surrounding the inter-substrate gap. The ring is coupled to the housing at a plurality of embossments either by welding or mechanical couplings.

3 Claims, 5 Drawing Sheets

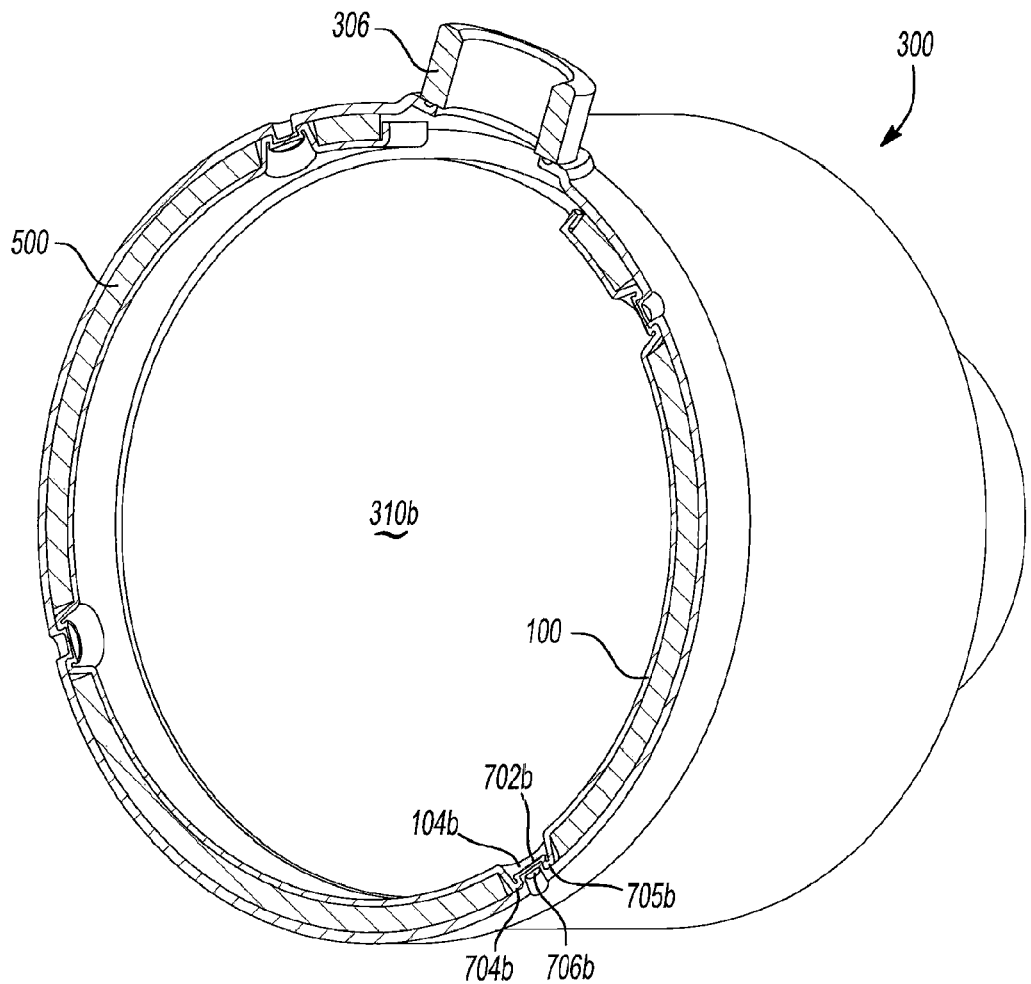
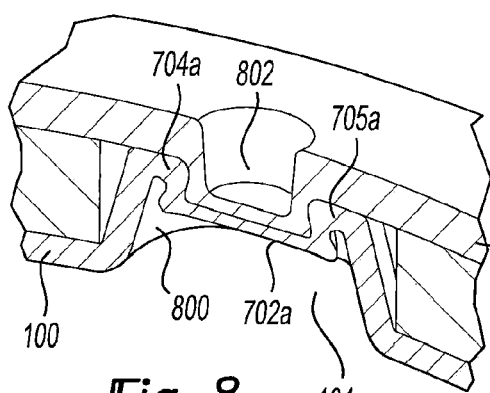 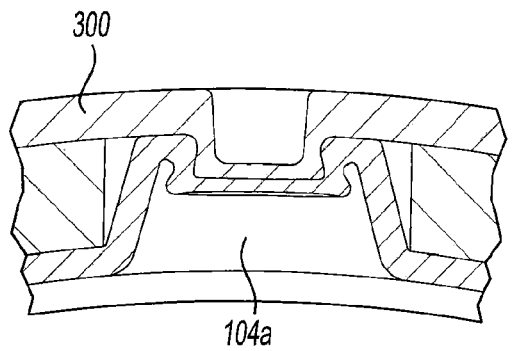

CATALYTIC CONVERTER WITH MOUNTING DEVICE FOR A HOT EXHAUST GAS OXYGEN SENSOR

CROSS REFERENCE TO RELATED APPLICATIONS

This application claims the benefit of U.S. Provisional Application No. 60/872,588, filed Dec. 1, 2006, which is hereby incorporated by reference.

FIELD

The present disclosure relates to automotive catalytic converters. More particularly, the disclosure pertains to such converters having the capability of mounting a hot exhaust gas oxygen sensor between two cakes or bricks of catalytic material carrying substrates.

BACKGROUND

The statements in this section merely provide background information related to the present disclosure and may not constitute prior art.

Prior vehicular emission monitoring systems utilize emission monitoring oxygen sensors on either end (i.e., upstream and downstream) of a catalytic converter for monitoring converter performance. With recent governmental regulatory changes, automotive manufacturers are now requiring mid-bed sensors, i.e., sensors mounted between two bricks of catalytic material carrying substrates inside the converter housing. This arrangement yields improved converter performance measurement, because the upstream substrate catalyst tends to degrade faster than the downstream substrate catalyst.

Providing a mid-bed sensor mounting arrangement has, in the past, raised problems of management of heat radiating from the converter shell in the shell area between the substrates. There is therefore seen to be a need in the converter art to provide a mid-bed sensor mounting arrangement which additionally provides insulation between exhaust flow and the converter shell located in the mid-bed region.

SUMMARY

A catalytic converter having a housing holding upstream and downstream catalytic substrates includes a ring located between the substrates, the ring having a gap therein for receipt of a mid-bed oxygen sensor. The ring traps a layer of insulating material between the ring and the converter housing or shell surface surrounding the inter-substrate gap. The ring is coupled to the housing by using a plurality of ring embossments extending toward the housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWING

The drawings described herein are for illustration purposes only and are not intended to limit the scope of the present disclosure in any way.

The objects and features of the present teachings will become apparent from a reading of the detailed description taken in conjunction with the drawing, in which:

FIG. 7 is a partial cross-sectional perspective view of an alternative converter arranged in accordance with the principles of the disclosed teaching;

FIG. 8 is a cross-sectional view of one of the mounting embossment regions of the mounting ring in the converter of FIG. 7; and FIG. 9 is a similar cross-sectional view to that of FIG. 8.

DETAILED DESCRIPTION

With reference to FIGS. 1A-1D, a ring for holding insulation and mounting an oxygen sensor is shown and designated 100. Ring 100 includes a gap 102 for receipt of an oxygen sensor through the shell of the converter and extending therein between the catalytic substrates. Circumferentially spaced about ring 100 are a plurality of, in this case four, embossment regions 104a-d at which the ring 100 is coupled to the converter shell in a manner to be discussed below.

Ring 100 forms a channel 110 between itself and the converter housing for positioning of a layer of insulative material between the ring and the housing shell.

Figure 1A:
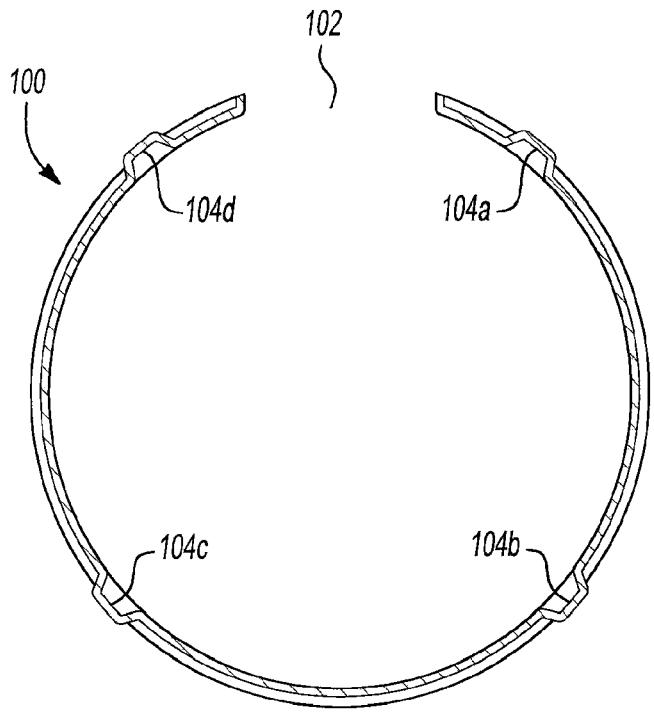
FIGS. 1A-1D present various isometric views of a converter insulation ring and sensor mounting device arranged in accordance with the principles of the disclosed teachings.
Figure 1B:
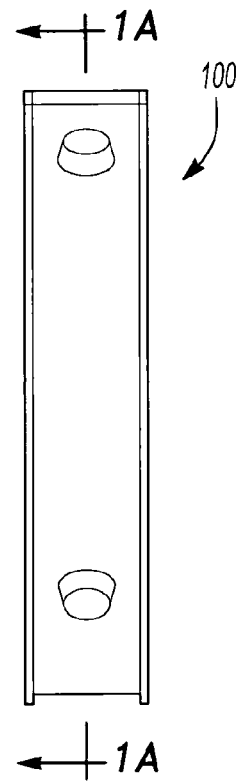
Figure 1C:
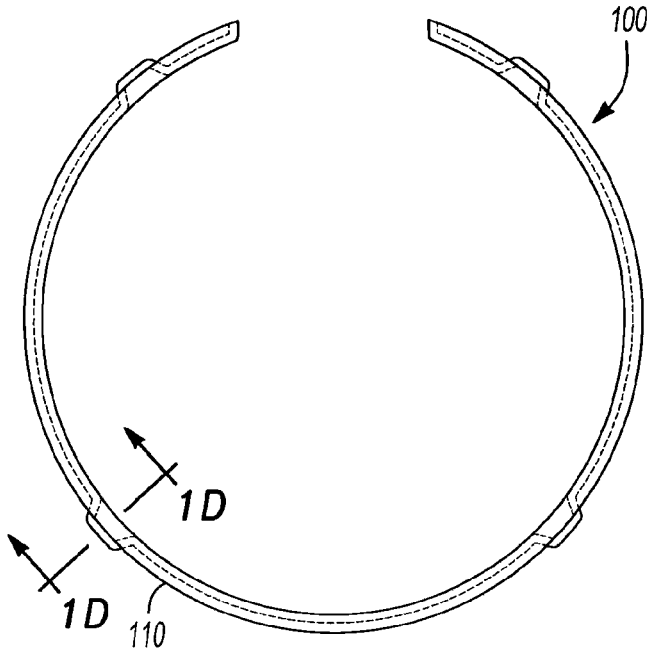
Figure 1D:
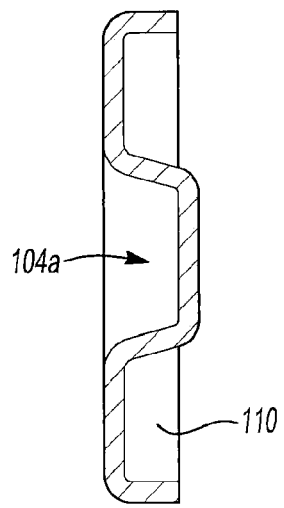
Figure 2A:
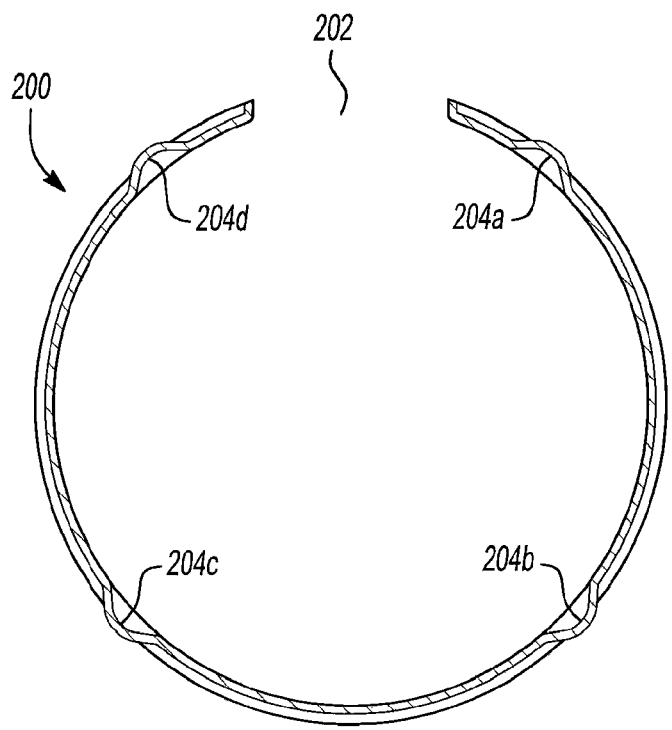
FIGS. 2A-2D present various isometric views of an alternative converter insulation ring and sensor mounting device arranged in accordance with the principles of the disclosed teachings.
Figure 2B:
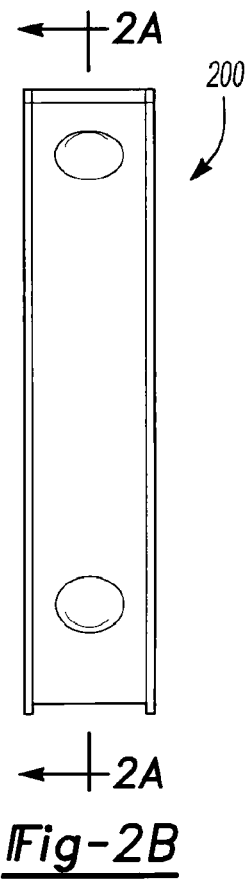
Figure 2C:
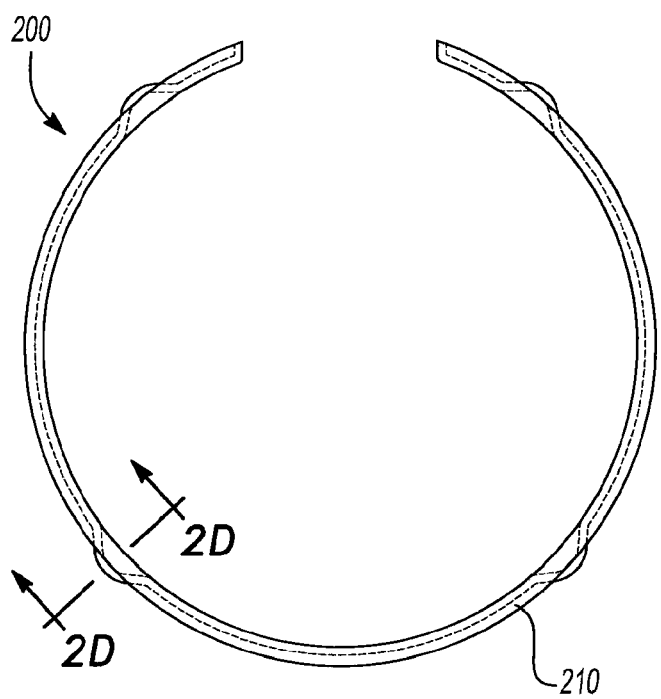
Figure 2D:
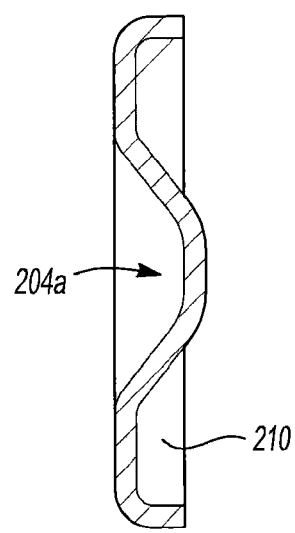

FIGS. 2A-2D are similar to FIGS. 1A-1D but show a ring 200 whose embossments are of a smoother curvilinear shape as seen from FIG. 2D. The embossment shape disclosed in FIGS. 2A-D is preferred, due to its ease of manufacturing. Embossment region 204a has less sharp corners than embossment 104a of FIG. 1D. With this arrangement of FIG. 2D, there is less likelihood of metal tearing during stamping of the rings.

Figure 3A:
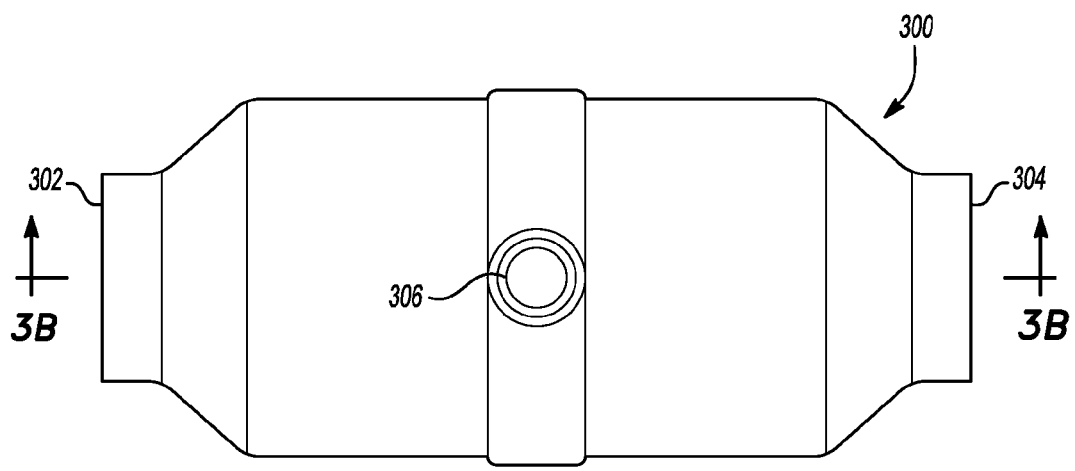
FIGS. 3A-3B respectively present side perspective and side cross-sectional views of a catalytic converter arranged in accordance with the principles of the disclosed teachings.
Figure 3B:
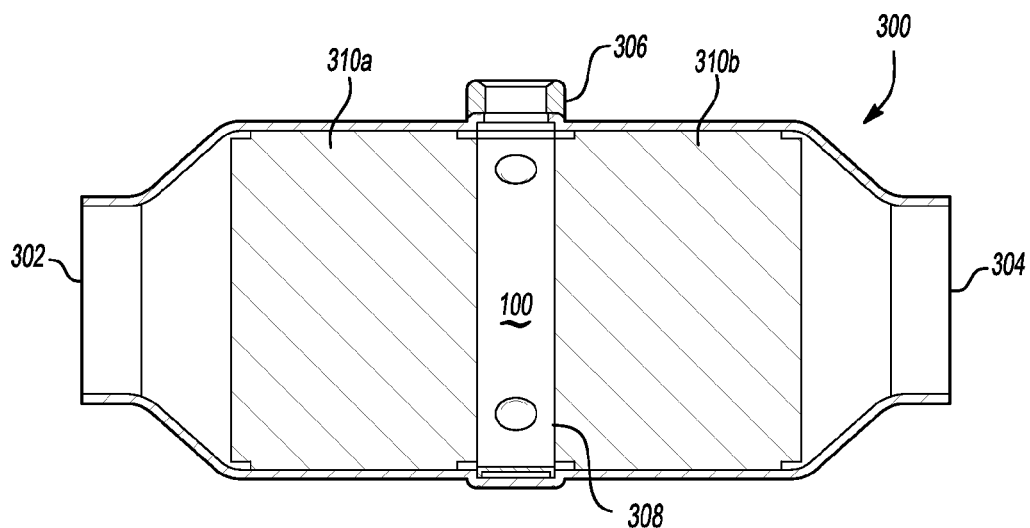

With reference to FIG. 3A and FIG. 3B, a catalytic converter 300 has a central shell housing first and second catalytic material carrying substrates 310a and 310b separated by a mid-bed gap 308. Insulating ring 100 includes a gap in communication with a sensor mounting boss 306. Conventionally, converter 300 includes an input cone 302 and an output cone 304. Boss 306 receives an oxygen sensor (not shown) which extends into the gap 308. In this manner, an upstream sensor and the sensor mounted at boss 306 are used to monitor the performance of catalytic substrate 310a.

Figure 4:
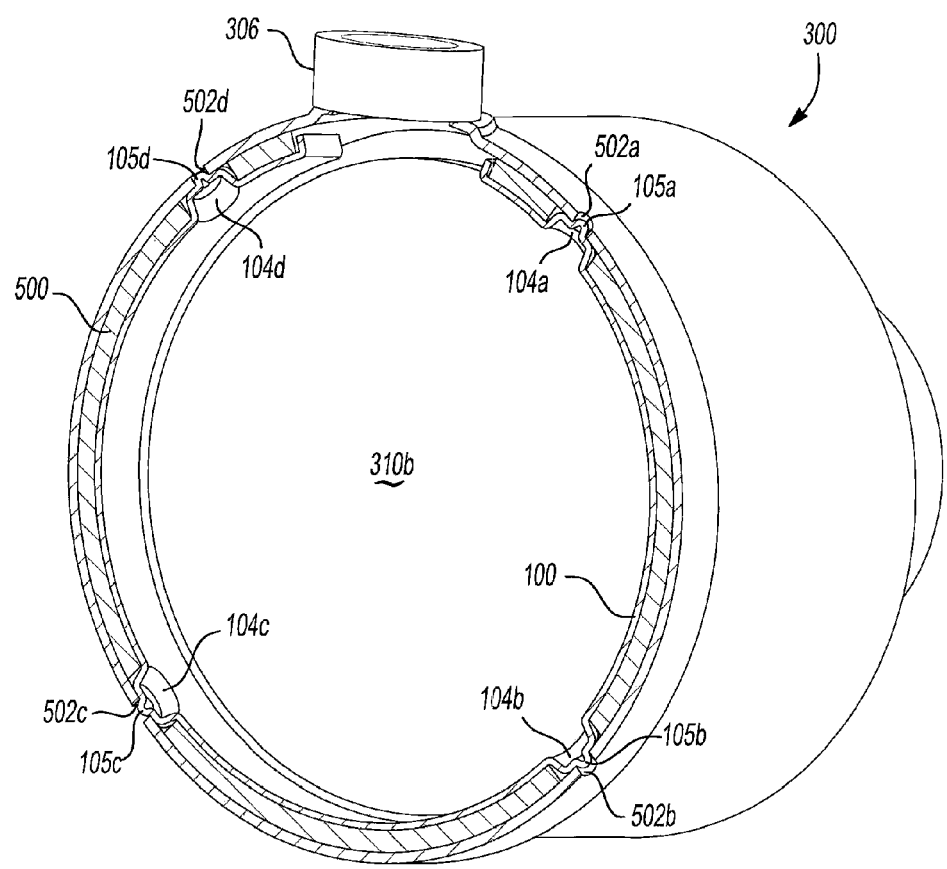
FIG. 4 is a partial cross-sectional perspective view of the converter of FIGS. 3A-3B.

FIG. 4 is a partial cross-sectional perspective view of the converter of FIGS. 3A-3B and essentially takes a view at the mid-bed section towards substrate 310b. Spaced around the converter shell 300 which lies over ring 100 are a plurality of perforations 502a-d which are located over each embossment area 104a-d of ring 100. As seen from FIG. 4, each embossment has a dimple or button 105a-d formed therein for receipt in a corresponding perforation 502a-d in housing shell 300. Insulation 500 is trapped between ring 100 and converter shell 300 in this mid-bed area. Sensor mounting boss 306 is located at the gap in ring 100 and receives an oxygen sensor (not shown). Once ring 100 and its embossment region buttons 105 have been properly located and inserted in openings 502, a puddle weld is performed at each opening 502. For example, a MIG welder could flow molten material onto the button areas 105 by flowing through perforations 502, thereby attaching ring 100 to shell 300.

Figure 5:
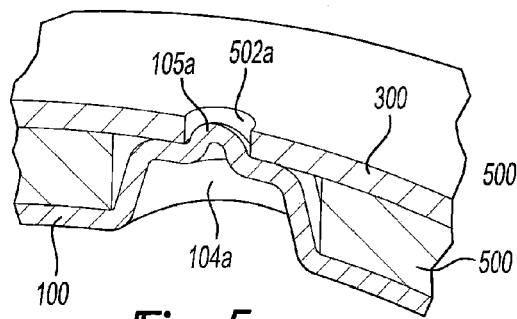
FIG. 5 is a cross-sectional view of one of the mounting embossment regions of the mounting ring in the converter of FIG. 4.

FIG. 5 presents embossment region 104a in more magnified detail.

Figure 6:
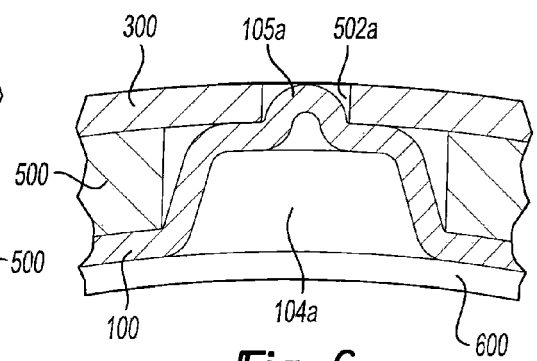
FIG. 6 is a similar cross-sectional view to that of FIG. 5.

FIG. 6 is essentially the same as FIG. 5.

With reference to FIGS. 7-9, an alternative mounting arrangement for ring 100 is presented. In the embodiment of FIGS. 7-9, ring 100 is coupled to shell 300 via a mechanical coupling rather than by welding. The mechanical coupling at each embossment area 104 is accomplished using a pair of tools—a male tool on the outside of shell 300 and a female tool impressed against the inner surface of mounting ring 100 opposite to the male tool. Through using these tools, at each embossment location, shell 300 is indented as at 802 by the male tool bearing against the outside surface of shell 300 while ring 100 is deformed to form a U-shaped section 702a which surrounds indentation 802 with legs 704a and 705a in a crimping manner to effect a mechanical linkage between ring 100 and shell 300.

The invention has been described with reference to embodiments which have been set forth for the sake of example only. The scope and spirit of the invention will become apparent from proper interpretation of the appended claims.

What is claimed is:

1. A catalytic converter comprising:
   a housing including an opening and a plurality of perforations;
   upstream and downstream catalytic substrates positioned within the housing and separated by a mid-bed gap;
   a ring having a gap in communication with the mid-bed gap, aligned with the opening in the housing and adapted to receive an exhaust sensor extending therethrough;
   a plurality of ring embossments extending radially outwardly from the ring and operative to enable coupling of the ring to the housing at a corresponding perforation of the plurality of perforations; and
   a layer of insulative material positioned between the ring and the housing between pairs of the embossments, each said embossment having a dimple extending from an outer surface of the embossment and shaped for receipt of at least a portion of the dimple by a corresponding one of the housing perforations.

2. The catalytic converter of claim 1 wherein the embossments are substantially devoid of sharp corners.

3. The catalytic converter of claim 1 wherein each dimple is welded to the housing at the corresponding housing perforation.

* * * * *